United States Patent Office 2,744,878
Patented May 8, 1956

2,744,878

ELASTIC ORGANOPOLYSILOXANES OF IMPROVED HEAT RESISTANCE AND ADHESION CONTAINING AN ORGANIC SILICATE AND CALCIUM CARBONATE

Robert Smith-Johannsen, Niskayuna, N. Y., assignor to General Electric Company, a corporation of New York No Drawing. Application February 27, 1953,
Serial No. 339,461

23 Claims. (Cl. 260—37)

This invention is concerned with improving the heat resistance and adhesive properties of silicone rubbers to solid surfaces. More particularly, the invention relates to organopolysiloxanes convertible by heat to the solid elastic state wherein the heat-converted products have improved heat resistance and better adhesion to solid surfaces, the aforesaid improved compositions comprising (1) a filled preformed organopolysiloxane, e. g., a hydrocarbon-substituted polysiloxane, convertible to the solid, elastic state and (2) a minor proportion of an organo-silicon composition selected from the class consisting of (a) hydrolyzable organosilicates corresponding to the general formula (I) 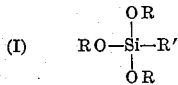

where R and R' are each members selected from the class consisting of alkyl groups and halogenated alkyl groups, and R' in addition is a member selected from the class consisting of aryl, aralkyl, alkaryl, alkoxy, aryloxy groups, and halogenated derivatives of the aforesaid aryl, aralkyl, alkaryl, alkoxy, and aryloxy groups, and (b) liquid, partially hydrolyzed products derived from the aforesaid hydrolyzable organo-silicates described in (a) above.

In my copending application, Serial No. 190,241 filed October 14, 1952, and assigned to the same assignee as the present invention, I disclosed a method for improving the adhesion of organopolysiloxanes ("silicone rubbers") convertible to the solid elastic state to various surfaces by first applying a primer coating to the solid surface comprising a compound corresponding to the formula

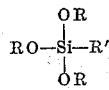

where R and R' have the meanings designated above. If the convertible organopolysiloxane is applied to such a primed surface, it will be found that the organopolysiloxane will adhere tenaciously to the surface after curing of the convertible organopolysiloxane to the substantially infusible and insoluble state, and the same degree of adhesion will be maintained during further heat-aging.

I have now discovered that I am able to impart the same adhesion of the convertible organopolysiloxanes to solid surfaces by incorporating water-insoluble partial hydrolysis products of the aforesaid organosilicates (I) prior to application of the convertible organopolysiloxane to the solid surface and curing thereof. In addition, unexpectedly, I have found that the incorporation of both the monomeric organosilicates (I) and partial hydrolysis products of the latter, in the above-mentioned organopolysiloxane improves the heat resistance of the latter to an extent that the modified filled organopolysiloxane in the heat-coverted cured state can be subjected to much higher temperatures for longer periods of time than has heretofore been possible with the usual convertible organopolysiloxanes which in themselves have good heat resistance.

It is, therefore, one of the objects of this invention to improve the adhesion of silicone rubbers to various surfaces so as to give a bond at least as strong as the cohesive forces of the silicone rubber itself.

Another object of this invention is to improve the heat resistance of the silicone rubber so that it is able to withstand temperatures from about 480° to 600° F. for long periods of time.

A still further object of the invention is to improve the strength properties of convertible organopolysiloxanes.

An additional object of the invention is to improve the compression set of heat-converted organopolysiloxanes when the latter are subjected to pressures at elevated temperatures.

Other objects of this invention will become apparent from the description which is given below.

All the foregoing objects can be obtained by incorporating in a heat-convertible organopolysiloxane small amounts of organo-silicon compounds corresponding to the general formula

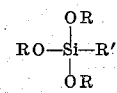

and liquid partial hydrolysis products of the aforementioned organo-silicon compounds, where R and R' have the meanings given above. For brevity, these organosilicon compounds, both hydrolyzable and partially hydrolyzed products, will hereinafter be referred to by the name "organo-silicon compound."

The term "partial hydrolysis products" herein employed is intended to mean liquid polysiloxanes retaining sufficient silicon-bonded alkoxy radicals to maintain the hydrolysis product in an adequate state of water insolubility. By maintaining this state (of incomplete hydrolysis) it can be more readily isolated for use in my invention, and in addition, will be more readily soluble in the convertible organopolysiloxane. The method for effecting hydrolysis to accomplish the above ends will be readily apparent to those skilled in the art, especially when one considers the examples describing the practice of the invention. The hydrolysis obviously should not proceed to the point where all the silicon-bonded alkoxy (OR) groups are removed so that the monomeric silane is reduced to a sol or gel of $SiO_2$.

In the specification and in the claims, for brevity, the convertible organopolysiloxanes, which may be viscous masses or gummy solids, depending on the state of condensation, will hereinafter be referred to as "convertible organopolysiloxanes" or more specifically as "convertible methyl polysiloxanes." Although convertible organopolysiloxanes with which the present invention is concerned are now well known in the art, for the purpose of showing the various convertible organopolysiloxanes which may be employed in the practice of the present invention, attention is directed to the convertible organopolysiloxanes disclosed in Agens Patent 2,448,756 and Sprung et al. Patent 2,448,556, the latter two patents being issued September 7, 1948; Sprung Patent 2,484,595 issued October 11, 1949; Krieble et al. Patent 2,457,688 issued December 28, 1948; Marsden Patent 2,521,528 issued September 5, 1950; all the foregoing patents being assigned to the same assignee as the present invention; Hyde Patent 2,490,357 issued December 5, 1949; and Warrick Patent 2,541,137 issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals) connected to the silicon atoms by carbon-silicon linkages, may be employed without departing from the scope of this invention. The particular convertible organopolysiloxane used is not critical and may be any one of those described in the foregoing patents generally obtained by condensation of a liquid organopolysiloxane containing an average of from about 1.95, preferably from about 1.98 to about 2.05 organic groups per silicon atom. The condensing agents which may be employed are well known in the art and may include, for instance, ferric chloride hexahydrate, phenyl phosphoryl chloride; alkaline condensing agents, such as potassium hydroxide, sodium hydroxide, etc. Each convertible organopolysiloxane generally comprises polymeric diorganosiloxanes which may contain, if desired, for example, up to 2 mol per cent copolymerized mono-organosiloxane, for example, copolymerized monomethylsiloxane. Generally, I prefer to use as the starting liquid organopolysiloxanes from which the convertible, for example, heat-convertible organopolysiloxanes are prepared, ones which contain about 1.999 to 2.01, inclusive, organic groups, for example, methyl groups per silicon atom, and where preferably more than 75 per cent of the silicon atoms in the polysiloxane contains two silicon-bonded lower alkyl groups.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula R''$_2$SiO where R'' is preferably a radical of the group consisting of methyl and phenyl radicals. At least 90 per cent of the total number of R groups are preferably methyl radicals. The polysiloxane may be one in which all the siloxane units are (CH$_3$)$_2$SiO, or the siloxane may be a copolymer of dimethylsiloxane with a minor amount (e. g., from 1 to 20 or more mol per cent) of any of the following units, alone or in combination therewith: C$_6$H$_5$(CH$_3$)SiO and (C$_6$H$_5$)$_2$SiO. The presence of halogen, e. g., chlorine, atoms on the phenyl nucleus is not precluded.

The particular organo-silicon compounds employed in the practice of the present invention (either unhydrolyzed or hydrolyzed liquid products) and coming within the general formula

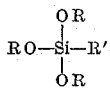

may, of course, be varied depending on the designation of R and R' in the formula. Thus, for example, R may be methyl, ethyl, propyl, isopropyl, butyl, amyl, isoamyl, octyl, iso-octyl, decyl, dodecyl, halogenated alkyls, e. g., beta-chloroethyl, etc., radicals. R' may be the same as R including halogenated derivatives of alkyl groups, as, for example, the chlorinated, brominated, fluorinated, etc., radicals, and the number of such halogens on the alkyl group may, of course, be varied, for example, from 1 to 4 or more. In addition, R' may include alkoxy and aryloxy groups corresponding to the general formula, —OZ, where Z is, for instance, an alkyl group of the same class described above for R, or additionally Z may be an aryl, aralkyl, and alkaryl radical, for example, phenyl, tolyl, xylyl, benzyl, phenylethyl, naphthyl, anthracyl, biphenyl, etc., radical, as well as various halogenated derivatives of these aryl, aralkyl and alkaryl radicals, attached to the silicon atom through the medium of an oxygen atom. Thus, the halogens, for example, chlorine, bromine, etc., may be attached in any position in the alkyl group or in the aryl group and may comprise any number of halogens. When halogen is attached to an alkyl group, either in the R or R' radical, it is preferable that the halogen should not be attached to the alpha carbon atom in order to attain improved stability of such substituted alkyl groups.

As examples of monomeric organo-silicon compounds, I prefer to use organosilicates corresponding to the general formula (RO)$_4$Si, where R is an alkyl group as defined above. In addition to employing the liquid monomeric organosilicates described above in the practice of the present invention, I may also use liquid partially hydrolyzed products derived therefrom. Such hydrolysis products are generally obtained by effecting partial hydrolysis in water of the particular monomeric organosilicate in the presence of small amounts of acid to a point where it is still water-insoluble and it is still possible to isolate a liquid partially hydrolyzed organosilicon compound. Thus, taking as a specific example the controlled partial hydrolysis of ethyl silicate having the formula (C$_2$H$_5$O)$_4$Si, the hydrolysis of the latter may be carried out by adding acids or acid-forming metal salts to the liquid monomeric organosilicate, for instance, FeCl$_3$, CuCl$_2$, AlCl$_3$, SnCl$_4$, etc., and thereafter effecting suitable hydrolysis of this mixture of ingredients in water to obtain the two phase composition from which the water-insoluble partially hydrolyzed organosilicate can readily be separated from the aqueous phase and catalyst.

The amount of organosilicon compound (either the monomeric or partially hydrolyzed product) which may be added to the convertible organopolysiloxane may be varied within fairly wide limits. Noticeable effects of the organosilicates are apparent when amounts as small as 0.01%, by weight, of the organo-silicon compound are added, based on the weight of the convertible organopolysiloxane. Generally, I may advantageously employ from about 0.01 to about 8%, by weight, of the organo-silicon compound, based upon the weight of the aforementioned convertible organopolysiloxane. Amounts in excess of 8% appear to give little, if any, additional improvement in the properties of the convertible organopolysiloxane.

No particular precaution need be taken when incorporating the organo-silicon compound in the convertible organopolysiloxane. The incorporation of the organo-silicon compound may be done on the usual compounding rolls at the same time that the filler and curing agent for the convertible organopolysiloxane are added. If the organo-silicon compound is incorporated after the filler is added to the convertible organopolysiloxane, for optimum adhesion characteristics, it is essential that the filled convertible organopolysiloxane be used and cured within about 12 hours after adding the organo-silicon compound. Additional improvements in properties may be realized by heating the mixture of filled convertible organopolysiloxane and organo-silicon compound to a temperature ranging from about 100° to 175° C. for about 15 to 60 minutes, cooling the mixture and thereafter adding the curing agents.

More stable products can be obtained by first mixing the filler and the organo-silicon compound, and then heating the mixture for periods ranging from about 10 to 60 minutes at temperatures ranging from about 125° to 175° C. (usually heating on the mixing rolls is sufficient). Thereafter, the convertible organopolysiloxane is added together with the curing agent, and this mixture can be stored for relatively long periods of time without any apparent adverse effect on the adhesion properties of the composition. The addition of solvents such as toluene, xylene, etc., to make solutions and dispersions for coating purposes is not precluded. Maximum heat-aging qualities of my compositions are also obtainable by the last procedure whereby direct contact between the filler and organo-silicon compound at elevated temperatures takes place. With respect to curing agents used for the purpose, one may employ, for instance, benzoyl peroxide, tertiary butyl perbenzoate, etc. These curing agents (or vulcanization accelerators as they are often designated) may be present in amounts ranging from about 0.1 to as high as 4 to 8%, by weight, or more of the curing agent, based on the weight of the convertible organopolysiloxane.

Among the fillers which are incorporated in the convertible organopolysiloxane may be mentioned, for instance, titanium dioxide, lithopone, zinc oxide, zirconium silicates, silica aerogel, iron oxide, diatomaceous earth, calcium carbonate, fumed silicas, etc. The amount of filler used may obviously be varied within wide limits, for instance, from about 10% to about 300%, by weight, of the filler, based on the weight of the convertible organopolysiloxane. The exact amount of filler used will depend upon such factors as, for instance, the application for which the coverted organopolysiloxane is intended, the type of filler employed (e. g., density of the filler) the type of convertible organopolysiloxane employed, etc.

After incorporation of the organo-silicon compound curing agent, filler, and any other modifying agents, for instance, dyes, pigments, etc., often used with heat-convertible organopolysiloxanes, the latter may be applied to the surface to which adhesion is desired or it may be cured for use in other applications where adhesion is not the intended use. Such curing cycles may vary and are generally carried out at temperatures ranging from about 100° to 150° C. for varying lengths of time, for instance, of the order of from about 5 to 30 minutes or more. If pressure is employed, it is generally desirable to employ pressures ranging from about 10 to 500 p. s. i. or more. The sample is preferably given a further heat cure at elevated temperatures, for example, at 150° C. followed by a higher temperature, for example, for about 24 hours at 250° C. to bring out the optimum properties of the heat-converted organopolysiloxane.

In applying the convertible organopolysiloxane containing the organo-silicon compound therein to various surfaces, it is generally desirable that the surface be clean and substantially free of poorly adhering oxide in order to improve the adhesion of the convertible organopolysiloxane to the solid surface. Under some conditions, for instance, in bonding to copper or steel, the solid surfaces may be treated with various oxide removers, for instance, hydrochloric acid, etc., and treated in such a fashion that further oxide formation is inhibited. If these precautions are observed, it will be found that the heat-convertible organopolysiloxane containing the organosilicon compound will adhere tenaciously to the solid surface.

In order that those skilled in the art may better understand how the present invention may be practiced, the following examples are given by way of illustration and not by way of limitation. All parts are by weight. In the following examples, the heat-curable organopolysiloxane used was obtained by hydrolyzing essentially pure dimethyldichlorosilane, isolating the liquid polymer obtained as a result of this hydrolysis, and condensing the liquid organopolysiloxane with a condensing agent comprising a small amount of, for example, about 0.01%, by weight, thereof, KOH until a highly viscous mass bordering on a gummy solid was obtained. This methyl polysiloxane had a ratio of approximately two methyl groups per silicon atom.

EXAMPLE 1

In this example, 100 parts of the above-described heat-convertible methylpolysiloxane was mixed intimately with 40 parts silica aerogel (Santocel C) and 1.5 parts benzoyl peroxide. To this mixture was added 0.03%, by weight, thereof tertiary butoxy triethoxysilane. A sample of this material was pressed in a mold for about 15 minutes at a temperature of 150° C. under a pressure of about 500 p. s. i. As a control another sample was molded in which the tertiary butoxy triethoxysilane was omitted. Both samples were then heat-aged at 250° C. for various lengths of time to determine the effect of such heat aging on the properties of the two samples. The following Table I shows the results of the heat aging tests on the sample containing the tertiary butoxy triethoxysilane. The values in parentheses are the test results on the control sample which contained no tertiary butoxy triethoxysilane.

*Table I*

| Time, Hours | Percent Elongation | Tensile, p. s. i. | Tear Strength, p. s. i. |
|---|---|---|---|
| 24 | 250 (240) | 715 (600) | 60.9 (65) |
| 72 | 250 (140) | 728 (540) | 68.3 |
| 96 | 240 (hard and brittle after 100 hours). | 760 | 57.2 |
| 120 | 225 | 735 | 57.5 |
| 144 | 190 | 625 | 49.7 |
| 1,000 | 160 | 665 | |

It was noted that after the 1000 hour heat aging at 250° C. the sample had shrunk in size from 2 to 2½% from the size of the sample after it had been molded for one hour at 150° C. This was exceptional since the control sample when heated at the elevated temperatures described above shrank considerably more than the 2 to 2½% recorded for the sample containing the tertiary butoxy triethoxysilane.

EXAMPLE 2

In this example, 100 parts of the heat convertible polydimethylsiloxane described above and employed in the foregoing Example 1 was mixed with 50 parts calcium carbonate and 5 parts of the liquid water insoluble partial hydrolysis product of tetraethyl silicate. The latter polyethyl silicate, which is sold by Carbide and Carbon Chemicals Corporation of New York, N. Y., is sold under the name of Ethyl Silicate 40 and is a mixture of ethyl polysilicates having about 40% available silica, and is derived from the controlled hydrolysis of tetraethyl silicate, the formula for said polyethyl silicate being described as follows:

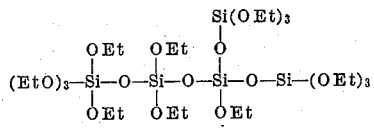

where $Et$ represents the $C_2H_5$ group. [Additional information for making the partial hydrolysis products of the monomeric organo-silicon compounds described in Formula I may be found in the article by H. D. Hogan and C. A. Setterstrom entitled "Ethyl Silicates" in Industrial and Engineering Chemistry, volume 39, page 1364, No. 11 (1947).] This mixture of ingredients was then heated at 130° C. for about 1 hour, cooled to around room temperature, and thereafter mixed with about 3.0 parts benzoyl peroxide. This formulation was then applied in the form of a thin film on glass cloth and the latter heated for 10 minutes at 150° C. and 10 minutes at 250° C. to effect curing of the methylpolyoxane. This cured sample was weighed and one portion of the coated cloth heated at 250° C. and the other portion heated at 315° C. The heating was continued in each case to determine the time required before one-half of the gum content of the coated glass cloth volatilized at each temperature. As a control another piece of glass cloth was coated with a mixture (commercially available silicone coating for glass cloth) in the same proportions of the above-mentioned polydimethylsiloxane, calcium carbonate, and benzoyl peroxide, but omitting the partially hydrolyzed ethyl silicate. The coating mixture was heated similarly as above at 130° C. for 1 hour, cooled, and the peroxide added prior to applying it and curing it on the glass cloth. The latter coated glass cloth was also divided into two parts and tested in the same manner at 250° C. and 315° C. It was found that the sample which contained the partially hydrolyzed ethyl silicate required 605 hours at 250° C. before half of the gum content had volatilized, and it required 192 hours at 315° C. before half of the gum content volatilized at this temperature. In contrast to this, the control sample lost half of its gum content after 60 hours at 250° C. and after 29 hours at 315° C. This example illustrates clearly the marked stabilizing effect on the heat-aging properties of the convertible organopolysiloxanes employed in the practice of the present invention.

I have also been able to increase the heat life of glass cloth heater duct coated and impregnated with a thin film of the above-described (Example 2) cured polydimethylsiloxane containing the same amount of calcium carbonate filler and benzoyl peroxide, but free of any organosilicon compounds, by immersing the glass cloth heater duct coated and impregnated with the heat-converted methylpolysiloxane in the above-identified hydrolysis product of ethyl silicate for about 15 minutes, removing the excess hydrolyzed ethyl silicate from the surface of the duct, and thereafter heating it at elevated temperatures. The improvement realized in the heat-aging of the heater duct was unusual. After 20 hours at 600° F., it was found that the treated duct was still in very good condition, flexible, and appeared to have the same physical characteristics as when originally made.

In contrast to this, a glass cloth heater duct coated with the same heat-converted methylpolysiloxane but which was not treated with the hydrolyzed tetraethyl-silicate, after 20 hours at 600° F. degraded to a point where the glass cloth unravelled and the methylpolysiloxane had substantially all volatilized.

EXAMPLE 3

In this example, a mixture comprising 100 parts of the polydimethylsiloxane described above, 45 parts silica aerogel, and 1.45 parts benzoyl peroxide was intimately mixed with 0.04%, by weight, tertiary butoxy triethoxysilane, based on the total weight of the polydimethylsiloxane, silica aerogel, and benzoyl peroxide. This mixture was then molded for about 50 minutes at 150° C. at a pressure of about 500 p. s. i. and thereafter heat-aged 24 hours at 250° C. This sample, together with a control sample, which was prepared, molded, and heat treated in the same way with the exception that the tertiary butoxy triethoxysilane was omitted, was tested for water absorption. The water absorption tests were conducted by immersing the respective sample totally in water at room temperature for about one week and measuring the percent increase in weight over the initial weight of the sample. Whereas the sample which did not contain tertiary butoxy triethoxysilane showed a moisture absorption of about 12%, the sample which contained a small amount of tertiary butoxy triethoxysilane showed a moisture absorption of about 8.5% moisture.

EXAMPLE 4

This example illustrates the ability to adhere silicone rubber to various surfaces by employing an organosilicon compound incorporated therein prior to application of the convertible organopolysiloxane to the aforesaid solid surface. More particularly, a mixture of 100 parts of the above-mentioned polydimethylsiloxane, 45 parts silica aerogel and 1.65 parts benzoyl peroxide was mixed with 0.4%, by weight, thereof of liquid, partially hydrolyzed tertiary butoxy triethoxysilane, based on the total weight of previous three ingredients and formed into a solution-dispersion in perchloroethylene whereby the former four ingredients were present in an amount equal to about 25% solids of the total solution. This solution-dispersion was painted on some copper foil which was allowed to air dry, and thereafter the copper foil was applied to a clean porcelain enamel surface to that the convertible methyl polysiloxane composition was between the enamel surface and the copper. The total assembly was heated at 300° C. for five minutes without pressure after which time it was found that a very strong and dense bond had developed which was very adherent to both the enamel surface and the copper foil. This clearly indicates that the presence of the hydrolyzed tertiary butoxy triethoxysilane in the convertible methyl polysiloxane acted as a means of inducing adhesion of the latter to the solid surface, since in the absence of this hydrolyzed organo-silicon composition, no adhesion could be effected.

EXAMPLE 5

In this example, 0.04%, by weight, of various organo-silicon compositions were added to the formulation described above, namely, 100 parts of the polydimethylsiloxane, 45 parts silica aerogel, and 1.65 parts benzoyl peroxide. Each mixture was molded at 150° C. for about 15 minutes at a pressure of about 500 p. s. i. A control was also made in which the organo-silicon compound was omitted. After the molding cycle, each sample was then heat-treated in an oven for two hours at 250° C., and the dimensions of this example taken. Thereafter, each sample was again heated at 250° C. for 94 hours and the dimensions of the sample again measured. The following Table II shows the percent shrinkage of the samples correlated with the specific organo-silicon compound employed.

*Table II*

| Organosilicate | Percent Shrinkage |
| --- | --- |
| Control—none | 0.75 |
| Di-(tertiary butoxy) diethoxysilane | 0.00 |
| Liquid hydrolyzed tertiary butoxy triethoxysilane | 0.00 |
| Para-chlorophenyl orthosilicate | 0.00 |
| Tertiary butoxy triethoxysilane | 0.25 |
| Methyl tripropoxysilane | 0.25 |
| Tertiary amyloxy triethoxysilane | 0.25 |
| Methyl tri-isopropoxysilane | 0.50 |
| n-Butoxy triethoxysilane | 0.50 |
| Dimethyldiethoxysilane | 0.50 |
| Ditertiary amyl diethoxysilane | 0.50 |
| Tetracresyl orthosilicate | 0.50 |

EXAMPLE 6

In this example, the heat-convertible formulation described in the above-mentioned examples comprising 100 parts of the polydimethylsiloxane, 45 parts silica aerogel, and 1.45 parts benzoyl peroxide had incorporated therein 0.04%, by weight, of the total formulation, of various organo-silicon compositions. Each mixture was molded for 15 minutes at 150° C. under a pressure of about 500 p. s. i. and thereafter heat-treated for 72 hours at 250° C. at the end of which time the Shore A hardness, tensile strength, and percent elongation were measured of each sample. In addition, the compression sets of the materials after 22 hours at 300° F. was also measured in accordance with ASTM D-395-49T. A control sample was also prepared similarly as above with the exception that the organo-silicon compound was omitted, and this control sample was tested for the same properties including percent compression set. The following Table III shows the particular organo-silicon employed as well as the various properties of the molded materials after the various heat-aging cycles.

*Table III*

| Organosilicate | Shore A Hardness | Percent Compression Set | Tensile, p. s. i. | Percent Elongation |
| --- | --- | --- | --- | --- |
| Control—none | 51 | 50.0 | 655 | 190 |
| Para-chlorophenyl orthosilicate | 51 | 40.0 | 723 | 180 |
| Tertiary butoxy triethoxysilane | 51 | 45.7 | 782 | 210 |
| Liquid hydrolysis product of tertiary butoxy triethoxysilane | 51 | 35.6 | 725 | 195 |

It will be noted from the above-identified table that the incorporation of the organo-silicon compounds greatly improved the compression set, and in addition improved many of the physical properties without in any way changing the hardness of the respective samples by virtue of the presence of the organo-silicon compound.

EXAMPLE 7

The liquid, water-insoluble, partial hydrolysis product of tertiary butoxy triethoxysilane was added in varying amounts to a formulation comprising 100 parts of the polydimethylsiloxane described above, 45 parts silica aerogel, and 1.45 parts benzoyl peroxide. Each of these formulations employing varying amounts of the liquid hydrolyzed tertiary butoxy triethoxysilane, together with a control formulation from which the liquid hydrolysis product was omitted, was molded for 15 minutes at 150° C. under a pressure of about 500 p. s. i. and thereafter tested for percent compression set after 22 hours at 300° F. and after 70 hours at 300° F., employing the same ASTM test described above. In addition, samples of each of these molded formulations were heat-aged for 24 hours at 250° C. and the tensile strength and percent elongation of the various samples also measured. The following Table IV shows the results of the various tests conducted on the sample and also recites the percent of liquid partially hydrolyzed tertiary butoxy silane employed in each case.

Table IV

| Percent Liquid Organosilicon Compound [1] | Compression Set 22 hrs. | Compression Set 70 hrs. | Tensile, p. s. i. | Elongation Percent |
| --- | --- | --- | --- | --- |
| Control—none | 51.5 | 71.1 | 695 | 210 |
| 0.5 | 34.9 | 54.9 | 730 | 200 |
| 1.0 | 27.8 | 45.4 | 720 | 200 |
| 1.5 | 28.8 | 50.3 | 810 | 190 |
| 2.0 | 28.0 | 44.2 | 725 | 210 |
| 3.0 | 37.2 | 53.2 | 700 | 200 |

[1] Based on the total weight of the ingredients.

It will, of course, be understood by those skilled in the art that organo-silicon compounds other than those employed in the foregoing examples, as well as other concentrations of the organosilicates and partially hydrolyzed organosilicates, may also be employed without departing from the scope of the invention. Other fillers, many examples of which have been given previously may be incorporated, and obviously the type of convertible organopolysiloxanes employed in the practice of the present invention may also be varied.

Instead of using a polymeric diorganosiloxane, as, for example, the polymeric dimethylsiloxane, containing about two organic groups, for example, methyl groups per silicon atom, convertible organopolysiloxanes containing up to at most 0.2 mol percent copolymerized monoorganosiloxane, for example, copolymerized monomethyl siloxane, may also be used in the present instance. Generally, I prefer that the organopolysiloxane from which the heat-curable or heat-convertible organopolysiloxane is prepared, contains about 1.998 to 2.0 inclusive, especially two organic groups, for example, methyl groups, methyl and phenyl groups, etc., per silicon atom, and that more than 98 per cent, for example 99.8 per cent of the silicon atoms in the polysiloxane contain two silicon-bonded organic groups, for instance, alkyl groups or mixtures of alkyl and aryl groups, for example, methyl groups, methyl and aryl groups, etc.

My invention is applicable for curing the convertible organopolysiloxanes on various glass surfaces, for example, glass tape, glass fibers, glass fiber sheets, etc. In the latter instance, glass cloth can be coated with convertible organopolysiloxanes containing filler, curing agents, and the particular organo-silicon compound, and thereafter the coated glass cloth can be wrapped around mandrels to make heater ducts, and cured under heat and pressure to give unitary structures having outstanding heat resistance. In addition, the bond realized between the converted organopolysiloxane and the glass cloth is usually so strong that attempts to pull the cured silicone rubber from the glass backing will result in tearing of the glass fibers themselves.

The present invention is useful in adhering silicone rubbers to various metal surfaces as well as to various siliceous, for example, glass or ceramic surfaces. It can be used to bond silicone rubber to magnesium window frames or to any other type of metallic window frame where it is desired to obtain a surface resistant to cold and heat, as well as to deterioration by the elements. In addition, electrical conductors, for example, copper conductors, can now be readily insulated with convertible organopolysiloxane and the total assembly cured under heat and pressure to give a unitary structure having good electrical properties and in which the heat resistance of the insulation is better than has heretofore been able to be obtained and, in addition, the adhesion of the insulation to the copper conductor is materially improved. Moreover, my invention has eminent utility in molding heat-curable silicone rubbers of the type described herein around metallic, e. g., steel inserts, to obtain a good bond between the silicone rubber and the metal insert. My invention permits ready molding of the convertible organopolysiloxane around all kinds of inserts without requiring a special priming step to obtain heat resistant, highly-adherent bonds between the silicone rubber and the inserts.

One of the unexpected features of the present invention resides in the fact that convertible organopolysiloxanes containing small amounts of the organosilicon compositions herein defined show scarcely any variation in dielectric strength at temperatures ranging from about 25° C. to 250° C. Thus, when glass cloth was coated with the coating composition described in Example 2 (comprising, by weight, 100 parts polydimethylsiloxane, 50 parts calcium carbonate, 5 parts polyethyl silicate, and 3 parts benzoyl peroxide) and the glass cloth heat-treated to effect suitable curing of the coating thereon, it was found that the dielectric strength remained almost constant at temperatures ranging from about room temperature up to about 250° C. In addition, it was found that although the coated glass cloth (about 10 mils thick) had an initial dielectric strength of 1212 volts per mil, after 1 hour immersion in water it had a dielectric strength of 622 volts per mil, while after 96 hours at 96% relative humidity at 25° C., the dielectric strength was 986 volts per mil. In the absence of the polyethyl silicate, the dielectric strength under the above conditions will be much less than is the case when the polyethyl silicate is included in the coating composition.

What I claim as new and desire to secure by Letters Patent of the United States is:

1. A heat and peroxide-curable composition of matter comprising (1) an organosilicon compound selected from the class consisting of (a) monomeric organosilicates corresponding to the general formula

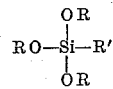

where R and R' are members selected from the class consisting of alkyl groups and halogen-substituted alkyl groups, and R', in addition, represents a member selected from the class consisting of aryl, aralkyl, alkaryl, alkoxy, aryloxy groups, and halogenated derivatives of the aforesaid aryl, aralkyl, alkaryl, alkoxy and aryloxy groups, and (b) liquid partial hydrolysis products of the aforementioned organosilicate monomeric compounds, (2) an alkaline-condensed organopolysiloxane convertible to the cured, solid, elastic state and consisting essentially of monovalent organic radicals and silicon and oxygen atoms in which the organic radicals are selected from the class consisting of methyl, ethyl, chlorophenyl, and phenyl radicals and are attached to silicon by carbon-silicon linkages in such ratio that there are present from about 1.95 to 2.05 organic radicals per silicon atom, and the organopolysiloxane consists essentially of recurring R''₂SiO units in which R'' is a member selected from the class consisting of methyl, ethyl, chlorophenyl, and phenyl radicals, (3) calcium carbonate as a filler, and (4) a peroxide curing agent for the aforesaid mixture of ingredients, the compositions (1), (3) and (4) being present, by weight, based on the weight of the alkaline-condensed organopolysiloxane, as follows: (a) organosilicon compound: from 0.01 to 8%, (b) calcium carbonate filler: at least 10%, and (c) peroxide curing agent: at least 0.1%.

2. A heat and peroxide-curable composition of matter comprising (1) tertiary butoxy triethoxysilane, (2) an alkaline-condensed methylpolysiloxane convertible to the cured, solid, elastic state and in which the methyl radicals are attached to silicon by carbon-silicon linkages, and are present in the ratio of from about 1.98 to 2.05 methyl groups per silicon atom and the methylpolysiloxane consists essentially of recurring (CH₃)₂SiO units, (3) calcium carbonate as a filler, and (4) an organic peroxide curing agent for the aforesaid mixture of ingredients, the compositions (1), (3) and (4) being present, by weight, based on the weight of the alkaline-condensed methylpolysiloxane, as follows: (a) tertiary butoxy triethoxysilane: from 0.01 to 8%, (b) calcium carbonate filler: at least 10%, and (c) peroxide curing agent: at least 0.1%.

3. A heat and peroxide-curable composition of matter comprising (1) a liquid partial hydrolysis product of tetraethyl orthosilicate, (2) an alkaline-condensed methylpolysiloxane convertible to the cured, solid, elastic state and containing an average of from about 1.98 to 2.05 methyl groups per silicone atom in which the methyl groups are attached to the silicon atoms by carbon-silicon linkages, and consisting essentially of recurring (CH₃)₂SiO units, (3) calcium carbonate as a filler and (4) an organic peroxide curing agent for the aforesaid mixture of ingredients, the compositions (1), (3) and (4) being present, by weight, based on the weight of the alkaline-condensed methylpolysiloxane, as follows: (a) the liquid partial hydrolysis product of tetraethyl orthosilicate: from 0.01 to 8%, (b) calcium carbonate filler: at least 10%, and (c) peroxide curing agent: at least 0.1%.

4. A heat and peroxide-curable composition of matter comprising (1) a liquid partially hydrolyzed tertiary butoxy triethoxysilane, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages, and consisting essentially of recurring (CH₃)₂SiO units, (3) calcium carbonate as a filler and (4) an organic peroxide curing agent for the aforesaid mixture of ingredients, the compositions (1), (3) and (4) being present, by weight, based on the weight of the alkaline-condensed methylpolysiloxane, as follows: (a) the liquid partially hydrolyzed tertiary butoxy triethoxysilane: from 0.01 to 8%, (b) calcium carbonate filler: at least 10%, and (c) peroxide curing agent: at least 0.1%.

5. A heat and peroxide-curable composition of matter comprising (1) ditertiary butoxy diethoxysilane, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages and consisting essentially of recurring (CH₃)₂SiO units, (3) calcium carbonate as a filler and (4) an organic peroxide curing agent for the aforesaid mixture of ingredients, the compositions (1), (3) and (4) being present, by weight, based on the weight of the alkaline-condensed methylpolysiloxane, as follows: (a) ditertiary butoxy diethoxysilane: from 0.01 to 8%, (b) calcium carbonate filler: at least 10%, and (c) peroxide curing agent: at least 0.1%.

6. A heat and peroxide-curable composition of matter comprising (1) tetra-(para-chlorophenyl) orthosilicate, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages and consisting essentially of recurring (CH₃)₂SiO units, (3) calcium carbonate as a filler and (4) an organic peroxide curing agent for the aforesaid mixture of ingredients, the compositions (1), (3) and (4) being present, by weight, based on the weight of the alkaline-condensed methylpolysiloxane, as follows: (a) tetra-(para-chlorophenyl) orthosilicate: from 0.01 to 8%, (b) calcium carbonate filler: at least 10%, and (c) peroxide curing agent: at least 0.1%.

7. A composition of matter obtained by heating a heat and peroxide-curable mixture of ingredients comprising (1) an organo-silicon compound selected from the class consisting of (a) monomeric organosilicates corresponding to the general formula

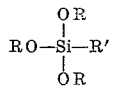

where R and R' are members selected from the class consisting of alkyl groups and halogen-substituted alkyl groups, and R' in addition represents a member selected from the class consisting of aryl, aralkyl, alkaryl, alkoxy, aryloxy groups, and halogenated derivatives of the aforesaid aryl, aralkyl, alkaryl, alkoxy and aryloxy groups, and (b) liquid partial hydrolysis products of the aforementioned organo-silicate monomeric compounds, (2) an alkaline-condensed organopolysiloxane convertible by heat to the cured, solid, elastic state and consisting essentially of monovalent organic radicals selected from the class consisting of methyl, ethyl, chlorophenyl, and phenyl radicals, and silicon and oxygen atoms in which the organic radicals are attached to silicons by carbon-silicon linkages and are present in the ratio of from about 1.95 to 2.05 organic groups per silicon atom and the organopolysiloxane consists essentially of recurring R''₂SiO units where R'' is a member selected from the class consisting of methyl, ethyl, chlorophenyl, and phenyl radicals, (3) calcium carbonate as a filler, and (4) a peroxide curing agent for (2), the compositions (1), (3) and (4) being present, by weight, based on the weight of the alkaline-condensed organopolysiloxane, as follows: (a) organosilicon compound: from 0.01 to 8%, (b) calcium carbonate filler: at least 10%, and (c) peroxide curing agent: at least 0.1%.

8. A composition of matter obtained by heating a heat and peroxide-curable mixture of ingredients comprising (1) tertiary butoxy triethoxysilane, (2) an alkaline-condensed methylpolysiloxane containing an average of from about 1.98 to 2.05 methyl groups per silicon atom in which the methyl groups are attached to the silicon atoms by carbon-silicon linkages, said methylpolysiloxane being convertible to the cured solid elastic state and consisting essentially of recurring (CH₃)₂SiO units, (3) calcium carbonate as a filler and (4) a peroxide curing agent for (2), the compositions (1), (3) and (4) being present, by weight, based on the weight of the alkaline-condensed organopolysiloxane, as follows: (a) tertiary butoxy triethoxysilane: from 0.01 to 8%, (b) calcium carbonate filler: at least 10%, and (c) peroxide curing agent: at least 0.1%.

9. A composition of matter obtained by heating a heat and peroxide-curable mixture of ingredients comprising (1) a liquid partial hydrolysis product of tetraethyl orthosilicate, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages and consisting essentially of recurring (CH₃)₂SiO units, (3) calcium carbonate as a filler and (4) a peroxide curing agent for (2), the compositions (1), (3) and (4) being present, by weight, based on the weight of the alkaline-condensed organopolysiloxane, as follows: (a) the liquid partial hydrolysis product of tetraethyl orthosilicate: from 0.01 to 8%, (b) calcium carbonate filler: at least 10%, and (c) peroxide curing agent: at least 0.1%.

10. A composition of matter obtained by heating a heat and peroxide-curable mixture of ingredients comprising (1) a liquid partial hydrolysis product of tertiary butoxy triethoxysilane, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages and consisting essentially of recurring $(CH_3)_2SiO$ units, (3) calcium carbonate as a filler and (4) a peroxide curing agent for (2), the composition (1), (3) and (4) being present, by weight, based on the weight of the alkaline-condensed organopolysiloxane, as follows: (a) the liquid partial hydrolysis product of tertiary butoxy triethoxysilane: from 0.01 to 8%, (b) calcium carbonate filler: at least 10%, and (c) peroxide curing agent: at least 0.1%.

11. A composition of matter obtained by heating a heat and peroxide-curable mixture of ingredients comprising (1) ditertiary butoxy diethoxysilane, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages and consisting essentially of recurring $(CH_3)_2SiO$ units, (3) calcium carbonate as a filler and (4) a peroxide curing agent for (2), the compositions (1), (3) and (4) being present, by weight, based on the weight of the alkaline-condensed organopolysiloxane, as follows: (a) ditertiary butoxy diethoxysilane: from 0.01 to 8%, (b) calcium carbonate filler: at least 10%, and (c) peroxide curing agent: at least 0.1%.

12. A composition of matter obtained by heating a heat and peroxide-curable mixture of ingredients comprising (1) tetra-(parachlorophenyl) orthosilicate, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages and consisting essentially of recurring $(CH_3)_2SiO$ units, (3) calcium carbonate as a filler and (4) a peroxide curing agent for (2), the compositions (1), (3) and (4) being present, by weight, based on the weight of the alkaline-condensed organopolysiloxane, as follows: (a) tetra-(para-chlorophenyl) orthosilicate: from 0.01 to 8%, (b) calcium carbonate filler: at least 10%, and (c) peroxide curing agent: at least 0.1%.

13. A composition of matter obtained by heating a heat and peroxide-curable mixture of ingredients comprising (1) a liquid partial hydrolysis product of tetraethyl orthosilicate, (2) an alkaline-condensed methylpolysiloxane convertible to the cured, solid, elastic state and containing an average of from about 1.98 to 2.05 methyl groups per silicon atom in which the methyl groups are attached to the silicon atoms by carbon-silicon linkages, and consisting essentially of recurring $(CH_3)_2SiO$ units, (3) calcium carbonate as a filler and (4) a curing agent for (2) comprising benzoyl peroxide, the compositions (1), (3) and (4) being present, by weight, based on the weight of the alkaline-condensed organopolysiloxane, as follows: (a) the liquid partial hydrolysis product of tetraethyl orthosilicate: from 0.01 to 8%, (b) calcium carbonate filler: at least 10%, and (c) peroxide curing agent: at least 0.1%.

14. The process for improving the heat-resistance of a heat and peroxide-cured alkaline-condensed organopolysiloxane convertible by heat to the cured, solid, elastic state and consisting essentially of monovalent organic radicals selected from the class consisting of methyl, ethyl, chlorophenyl, and phenyl radicals, and silicon and oxygen atoms in which the organic radicals are attached to silicon by carbon-silicon linkages and are present in a ratio of from about 1.95 to 2.05 organic groups per silicon atom and the organopolysiloxane consists essentially of recurring $R''_2SiO$ units where $R''$ is a member selected from the class consisting of methyl, ethyl, chlorophenyl, and phenyl radicals, which process comprises incorporating in the aforesaid organopolysiloxane (1) at least 10%, by weight, calcium carbonate as a filler, (2) from 0.01 to 8%, by weight, of an organosilicon compound selected from the class consisting of (a) monomeric organosilicates corresponding to the general formula

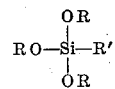

where R and R' are selected from the class consisting of alkyl groups and halogen-substituted alkyl groups, and R' in addition represents a member selected from the class consisting of aryl, aralkyl, alkaryl, alkoxy, aryloxy groups and halogenated derivatives of the aforesaid aryl, aralkyl, alkaryl, alkoxy and aryloxy groups, and (b) liquid partial hydrolysis products of the aforementioned organosilicate monomeric compounds, and (3) at least 0.1%, by weight, of a peroxide curing agent for the organopolysiloxane, the weights of (1), (2) and (3) being based on the weight of the aforesaid alkaline-condensed organopolysiloxane, and thereafter heating the mixture of ingredients at an elevated temperature to effect curing of the filled organopolysiloxane.

15. The process of improving the heat-resistance of a heat and peroxide-cured alkaline-condensed methylpolysiloxane convertible to the cured, solid, elastic state and containing an average of from about 1.98 to 2.05 methyl groups per silicon atom and consisting essentially of recurring $(CH_3)_2SiO$ units, which process comprises incorporating therein (1) at least 10%, by weight, of calcium carbonate as a filler, (2) from 0.01 to 8%, by weight, tertiary butoxy triethoxysilane, and (3) at least 0.1%, by weight, of a peroxide curing agent for the methylpolysiloxane, the weights of (1), (2) and (3) being based on the weight of the aforementioned alkaline-condensed methylpolysiloxane, and thereafter heating the mixture of ingredients to effect curing of the filled methylpolysiloxane.

16. The process of improving the heat-resistance of a heat and peroxide-cured alkaline-condensed methylpolysiloxane convertible to the cured, solid, elastic state and containing an average of from about 1.98 to 2.05 methyl groups per silicon atom and consisting essentially of recurring $(CH_3)_2SiO$ units, which process comprises incorporating therein (1) at least 10% by weight, calcium carbonate as a filler, (2) from 0.01 to 8% by weight, of a liquid partial hydrolysis product of tertiary butoxy triethoxysilane, and (3) at least 0.1% by weight, of a peroxide curing agent for the methylpolysiloxane, the weight of (1), (2) and (3) being based on the weight of the aforementioned alkaline-condensed methylpolysiloxane, and thereafter heating the mixture of ingredients to effect curing of the filled methylpolysiloxane.

17. The process of improving the heat-resistance of a heat and peroxide-cured alkaline-condensed methylpolysiloxane convertible to the cured, solid, elastic state and containing an average of from about 1.98 to 2.05 methyl groups per silicon atom and consisting essentially of recurring $(CH_3)_2SiO$ units, which process comprises incorporating therein (1) at least 10% by weight, calcium carbonate as a filler, (2) from 0.01 to 8% by weight, ditertiary butoxy diethoxysilane, and (3) at least 0.1%, by weight of a peroxide curing agent for the methylpolysiloxane, the weights of (1), (2) and (3) being based on the weight of the alkaline-condensed methylpolysiloxane, and thereafter heating the mixture of ingredients to effect curing of the filled methylpolysiloxane.

18. The process of improving the heat-resistance of a heat and peroxide-cured alkaline-condensed methylpolysiloxane convertible to the cured, solid, elastic state and containing an average of from about 1.98 to 2.05 methyl groups per silicon atom and consisting essentially of recurring (CH₃)₂SiO units, which process comprises incorporating therein (1) at least 10%, by weight, calcium carbonate as a filler, (2) from 0.01 to 8%, by weight, tetra-(para-chlorophenyl) orthosilicate, and (3) at least 0.1%, by weight, of a peroxide curing agent for the methylpolysiloxane, the weights of (1), (2) and (3) being based on the weight of the alkaline-condensed methylpolysiloxane, and thereafter heating the mixture of ingredients to effect curing of the filled methylpolysiloxane.

19. The process for improving the heat-resistance of a heat and peroxide-cured alkaline-condensed methylpolysiloxane convertible to the cured, solid, elastic state and containing an average of from about 1.98 to 2.05 methyl groups per silicon atom and consisting essentially of recurring (CH₃)₂SiO units, which process comprises incorporating therein (1) at least 10%, by weight, of calcium carbonate as a filler, (2) from 0.01 to 8%, by weight, of a liquid partial hydrolysis product of tetraethyl orthosilicate, and (3) at least 0.1%, by weight, of a curing agent for the methylpolysiloxane comprising benzoyl peroxide, the weights of (1), (2) and (3) being based on the weight of the alkaline-condensed methylpolysiloxane, and thereafter heating the mixture of ingredients to effect curing of the methylpolysiloxane.

20. The process for improving the heat-resistance of a heat and peroxide-cured alkaline-condensed methylpolysiloxane convertible to the cured, solid, elastic state and containing an average of from about 1.98 to 2.05 methyl groups per silicon atom, said methylpolysiloxane consisting essentially of recurring (CH₃)₂SiO units, which process comprises (A) incorporating in the aforesaid methylpolysiloxane (1) at least 10%, by weight, of calcium carbonate as a filler and (2) from 0.01% to 8%, by weight, of an organosilicon compound selected from the class consisting of (a) monomeric organosilicates corresponding to the general formula

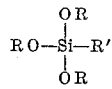

where R and R' are members selected from the class consisting of alkyl groups and halogen-substituted alkyl groups, and R' in addition represents a member selected from the class consisting of aryl, aralkyl, alkaryl, alkoxy, aryloxy groups and halogenated derivatives of the aforesaid aryl, aralkyl, alkaryl, alkoxy and aryloxy groups and (b) liquid partial hydrolysis products of the aforementioned organosilicate monomeric compounds, (B) heating the aforesaid mixture of ingredients to a temperature ranging from about 100° to 175° C., (C) cooling the heated mixture of ingredients to below 35° C., (D) adding at least 0.1%, by weight, of a peroxide curing agent for the aforesaid methylpolysiloxane, the weights of the calcium carbonate, the organosilicon compound and the peroxide curing agent being based on the weight of the alkaline-condensed methylpolysiloxane, and (E) heating the mixture of ingredients at elevated temperatures to effect curing of the methylpolysiloxane.

21. A composition of matter as in claim 1 wherein the mixture of the organosilicon compound, the alkaline-condensed organopolysiloxane and calcium carbonate are heated at a temperature of from 100° to 175° C. for about 15 to 60 minutes, and thereafter cooled, prior to adding the peroxy curing agent.

22. A composition of matter as in claim 3 in which the liquid partial hydrolysis product of tetraethyl orthosilicate, the alkaline-condensed methylpolysiloxane, and the calcium carbonate are heated at a temperature of from 100° to 175° C. for about 15 to 60 minutes, and thereafter cooled prior to adding the organic peroxide catalyst.

23. Glass fibrous material coated with the heat-treated composition of claim 7.

References Cited in the file of this patent
UNITED STATES PATENTS

| | | |
|---|---|---|
| 2,460,795 | Warrick | Feb. 1, 1949 |
| 2,472,629 | Spring | June 7, 1949 |
| 2,481,052 | Warrick | Sept. 4, 1949 |
| 2,541,137 | Warrick | Feb. 17, 1951 |
| 2,571,039 | Hyde | Oct. 9, 1951 |
| 2,692,844 | Hyde | Oct. 26, 1954 |